US006565611B1

(12) United States Patent
Wilcox et al.

(10) Patent No.: US 6,565,611 B1
(45) Date of Patent: May 20, 2003

(54) AUTOMATIC INDEX CREATION FOR HANDWRITTEN DIGITAL INK NOTES

(75) Inventors: Lynn D. Wilcox, Portola Valley, CA (US); Patrick Chiu, Menlo Park, CA (US); Todd A. Cass, San Francisco, CA (US); Shingo Uchihashi, Cupertino, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/258,464

(22) Filed: Feb. 26, 1999

(51) Int. Cl.[7] .............................................. G06F 17/00
(52) U.S. Cl. .................... 715/541; 715/501.1; 715/512; 382/224; 707/6
(58) Field of Search ................................ 707/512, 541, 707/513, 501.1, 6; 382/177, 181, 182, 224–225; 715/512, 541, 513, 501.1, 525

(56) References Cited

U.S. PATENT DOCUMENTS

| | | | | |
|---|---|---|---|---|
| 4,580,218 A | * | 4/1986 | Raye .............................. 704/1 |
| 5,404,295 A | * | 4/1995 | Katz et al. ...................... 704/9 |
| 5,428,777 A | * | 6/1995 | Perliski et al. ............... 706/934 |
| 5,513,305 A | * | 4/1996 | Maghbouleh ................. 345/781 |
| 5,524,240 A | * | 6/1996 | Barbara et al. ................. 707/3 |
| 5,537,491 A | * | 7/1996 | Mahoney et al. ............ 382/218 |
| 5,539,841 A | * | 7/1996 | Huttenlocher et al. ...... 382/218 |
| 5,596,700 A | * | 1/1997 | Darnell et al. ............... 345/781 |
| 5,748,805 A | * | 5/1998 | Withgott et al. ............. 382/306 |
| 5,822,539 A | * | 10/1998 | van Hoff ....................... 709/203 |
| 5,845,288 A | * | 12/1998 | Syeda-Mahmood ......... 707/102 |
| 5,873,107 A | * | 2/1999 | Borovoy et al. ................ 707/3 |
| 5,963,205 A | * | 10/1999 | Sotomayor .................. 707/531 |
| 6,069,618 A | * | 5/2000 | Ogo ............................ 345/173 |
| 6,151,021 A | * | 11/2000 | Berquist et al. ............. 345/764 |
| 6,311,189 B1 | * | 10/2001 | deVries et al. .............. 707/102 |
| 6,356,922 B1 | * | 3/2002 | Schilit et al. ................... 797/3 |
| 6,389,435 B1 | * | 5/2002 | Golovchinsky et al. ..... 345/764 |

OTHER PUBLICATIONS

"New CrossPad XP Offers a Lightweigh Design . . . ", IBM, <http://www.ibm.com/press/prnews.nsf/crawler/F3C89845C2D98BAD8525668D0045F32>, Sep. 28, 1998.*

"IBM Pen Technologies", IBM, <web.archive.org/web/2001031163520/www.research.ibm.com/handwriting/>.*

\* cited by examiner

Primary Examiner—Joseph H. Feild
(74) Attorney, Agent, or Firm—Fliesler Dubb Meyer & Lovejoy LLP

(57) ABSTRACT

A system for automatically generating indexes for handwritten notes captured as digital ink in a computer is disclosed. Ink words are identified, and features of the ink words are computed. Pairwise distances or match scores, which measure the distance in the features between two ink words, are calculated. A clustering technique selects equivalence classes of ink words. Index terms, which are non-uniform through-out the notes, are selected from the equivalence classes of ink words. The system generates an index from the index terms, including displaying pages numbers where the index terms are located in the notes as well as hyper-linking the index terms. A technique to identify a threshold for use in clustering the ink words is also disclosed.

19 Claims, 10 Drawing Sheets

FIG. 3
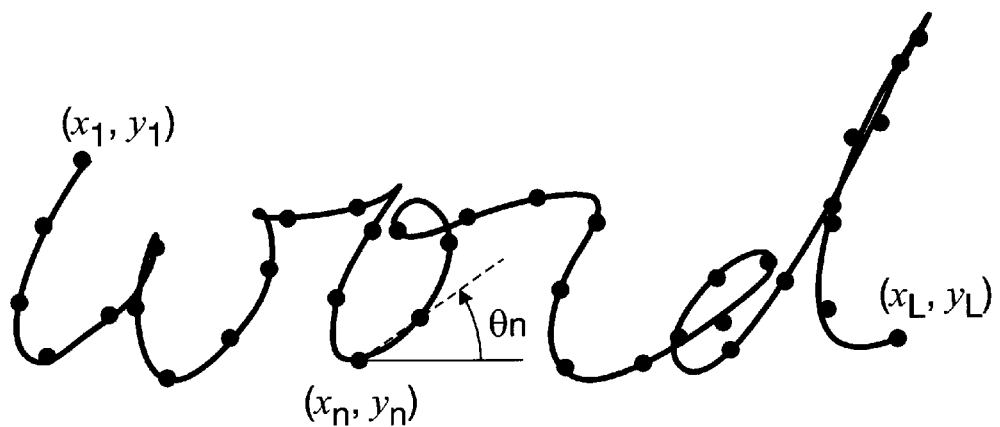
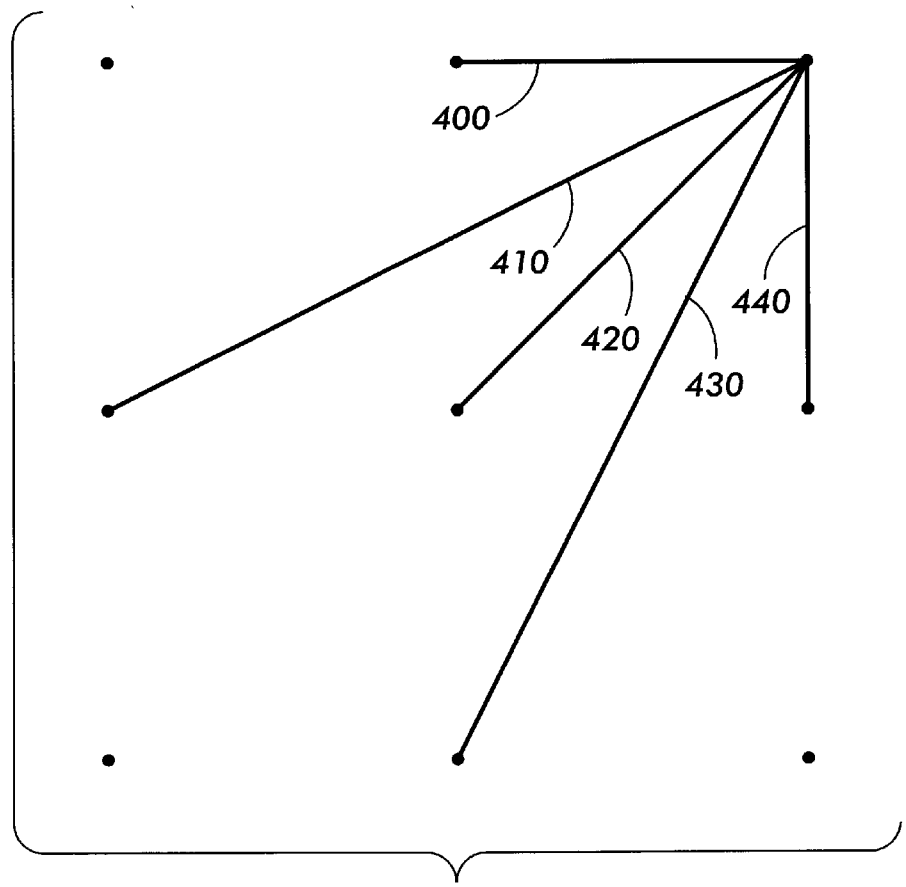
FIG. 4

AUTOMATIC INDEX CREATION FOR HANDWRITTEN DIGITAL INK NOTES

BACKGROUND OF THE INVENTION

1. Field of the Invention

The present invention is directed toward the field of computer systems that capture digital ink, and more particularly toward automated generation of an index for handwritten notes.

2. Art Background

Some computer systems, including personal digital assistants (PDAs), permit users to enter handwritten material into the computer. Essentially, these computers and PDAs include a user interface that permits a user to write handwritten material onto a surface, and the handwritten material or notes are subsequently sampled into "digital ink." One application of these computer systems is to permit a user to perform electronic note-taking.

One potential advantage of electronic note-taking over paper note-taking is the ability, in electronic note-taking, to create indexes. In general, indexes provide a means to locate specific information within the handwritten notes. With paper note-taking, such indexes must be created manually. Since this manual process is difficult, paper note-takers tend to mark important items or keywords by underlining, circling, or entering asterisks next to the important material. Although this type of highlighting helps users to locate important information while browsing notes, it does not provide an index.

In electronic document or text systems (i.e., systems where the text is cognitively recognized by the system), techniques exist to create automatic "back-of-the-book" indexes (See H. Schutze, "The Hypertext Concordance: A Better Back-Of-The-Book Index", Proc. COMPUTERM, ACL Coling, 1998). These back-of-book indexes allow users to scan a list of keywords in the index and find occurrences of the index terms in the text. However, these electronic text systems are based on the user entering text, such as from a keyboard, directly into the system.

In other electronic text systems, information retrieval techniques are used to automatically create indexing of textual documents. For example, in one such system, index terms are selected for Web pages based on relative frequency of term occurrence (See H. Schutze, "The Hypertext Concordance: A Better Back-Of-The-Book Index", Proc. COMPUTERM, ACL Coling, 1998). However, these techniques do not apply directly to digital ink, since words, in digital ink, are not cognitively identified. In theory, an attempt to convert digital ink to text using character recognition may be attempted. However, character recognition is not accurate on handwritten data. Accordingly, it is desirable to automatically generate indexes from handwritten data entered as digital ink into a computer without character recognition.

Manual indexing by the user is possible in electronic systems that use digital ink rather than text. One example is the application of keywords to sections of electronic notes, as provided by the Dynomite System, developed at FX Palo Alto Laboratory, and as provided by Marquis (See K. Weber and A. Poon, "Marquis: A Tool For Real-Time Video Logging", CHIN 94). However, requiring the user to manually identify keywords to generate the index requires, during the note taking process, cognitive effort on the part of the user.

Another application for manual indexing of digital ink by a user is through the development of ink properties in the Dynomite system. An ink property is a data type applied to selected digital ink, that allows that ink to be subsequently retrieved by type. Example data types include "name" or "to do" items. Ink index pages for a given ink property are created by a user to subsequently permit quick scanning of all notes that contain that property. In addition, notes on the index page are hyper linked back to the original location in the notes. One significant problem associated with both the keyword and ink property manual approaches to generate indexes for digital ink systems is that they require significant cognitive effort on the part of the user. As a result, these techniques are not practical because the user is typically not disciplined enough to do it.

A system for manually indexing historical handwritten document images is described in R. Manmatha, Chengfeng Han, E. M. Riseman and W. B. Croft, "indexing Handwriting Using Word Matching", ACM Digital Libraries, 1996. In this technique, images are segmented into words, and word equivalence classes are found by thresholding match scores between words. This technique requires the user to manually input words to specify the word equivalence classes. Index terms are then chosen from the largest word equivalence classes. In addition, stop words are manually eliminated. Since no stroke information on the handwritten data is available, match scores are computed based on the word images alone. Accordingly, it is desirable to automatically create indexes for handwritten digital ink, without user effort.

In A. Poon, K. Weber, T. Cass, "Scribbler: A Tool For Searching Digital Ink", CHI 95, a technique called scribble matching is described. In general, scribble matching involves finding occurrences of a given word in a handwritten document. This technique is based on using dynamic programming to compute a score between the given handwritten word and the words in the document. A similar method is also described in D. Lopresti and A. Tomkins, "On The Searchability Of Electronic Ink", Fourth International Workshop on Frontiers of Handwriting Recognition, December, 1994.

As is described fully below, the present invention provides a system for automatically generating indexes for handwritten notes based on the stokes of the digital ink.

SUMMARY OF THE INVENTION

A system automatically generates indexes for handwritten notes captured as digital ink in a computer. Ink words, which roughly correspond to words in the notes, are identified. Features of the ink words are computed, and pairwise distances or match scores, which measure the distance in the features between two ink words, are calculated. From the pairwise distances, equivalence classes of ink words are determined from clustering the ink words. Index terms, which appear in the index for the handwritten notes, are selected from the equivalence classes of ink words. The system generates location information for the index terms that identifies a location in the handwritten notes where the index terms appear. An index of the index terms are displayed with the location information. In one embodiment, the notes index contains page numbers, displayed next to the index terms, to identify the page in the handwritten notes where the index term appears. In another embodiment, the index contains hyper-linked index terms.

The system includes a novel technique to identify equivalence classes of ink words in handwritten notes. A threshold is generated to identify a maximum pairwise distance for the clustering of ink words. Specifically, a distribution curve, which represents a relationship between a number of occurrences among pairs of the ink words in the handwritten notes verse a pairwise distance, is generated. A knee of the distribution curve, τ, is approximated with a first line of gradient 0 to τ, and a second line comprising a constant gradient from the knee, τ, throughout pairwise distances on the distribution curve. The knee of the distribution curve, τ, is selected as the threshold for clustering.

BRIEF DESCRIPTION OF THE DRAWINGS

FIG. 3 illustrates an example re-sampled ink word, "word", with coordinates to identify the feature sequences.

FIG. 4 is a diagram showing allowable paths for dynamic programming.

DETAILED DESCRIPTION
System Overview

Figure 1:
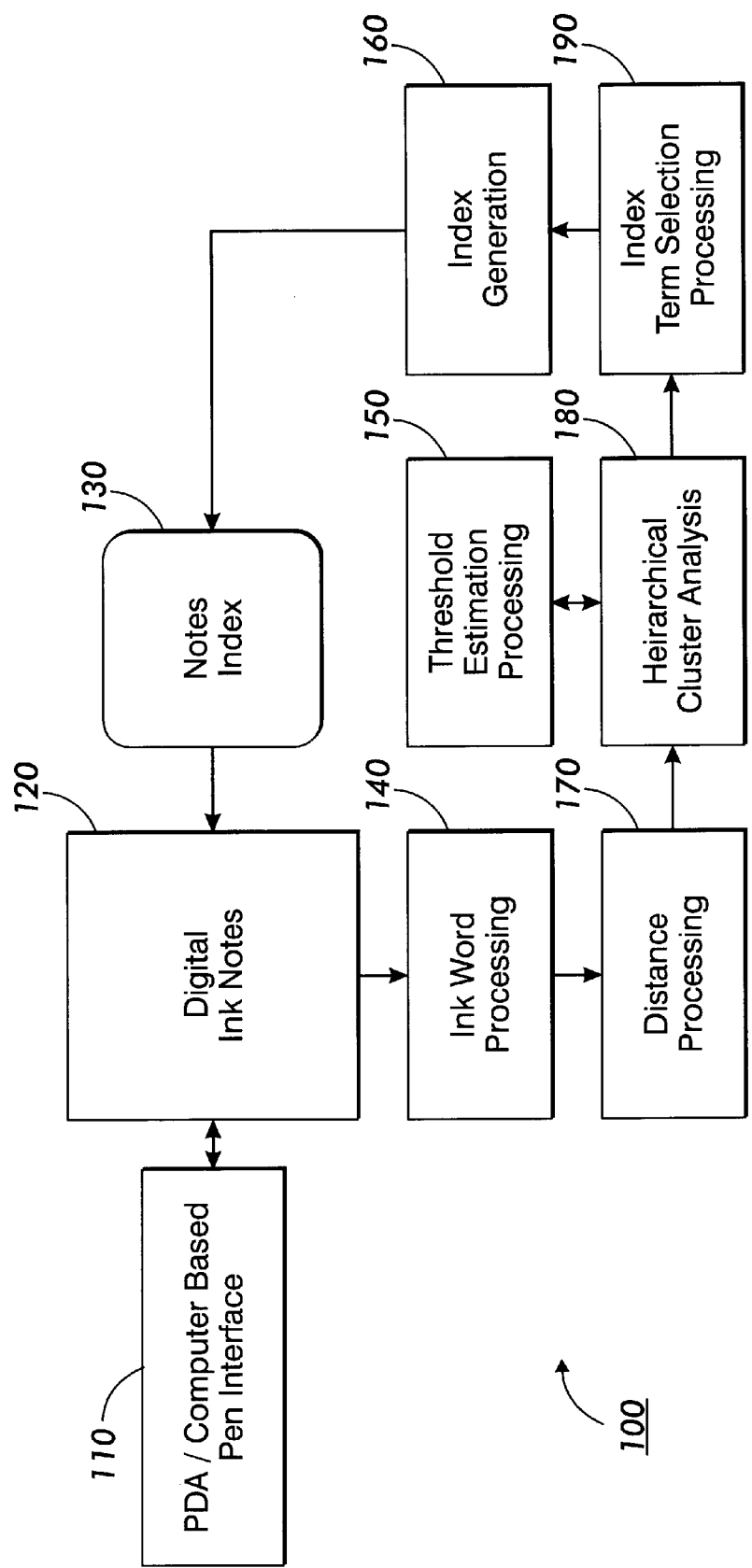
FIG. 1 is a block diagram illustrating one embodiment for the automatic index generation of handwritten ink notes system.

FIG. 1 is a block diagram illustrating one embodiment for the automatic index generation of handwritten ink notes system. In a preferred embodiment, the automatic indexing system 100 is implemented in a computer, such as a personal digital assistant (PDA). The system 100 contains a PDA/computer pen based interface 110. The PDA/computer pen based interface 110 receives handwritten notes from a user, and in turn, generates digital ink notes 120. Any type of pen based interface may be used to generate the digital ink notes 120. The digital ink notes 120 contains a digital version of the gestures and strokes generated on the pen based interface 110 by the user.

In general, the system 100 processes the digital ink notes 110 to generate a notes index 130. The notes index 130 is an index, which contains terms referred to as "index terms", for the digital ink notes 120. The notes index 130 provides information to link the index terms to locations in the digital ink notes 120 where those index terms are located. For this embodiment, to generate the notes index 130, the system includes ink word processing 140, distance processing 170, hierarchical cluster analysis 180, threshold estimation processing 150, index term selection processing 190, and index generation 160.

Figure 2:
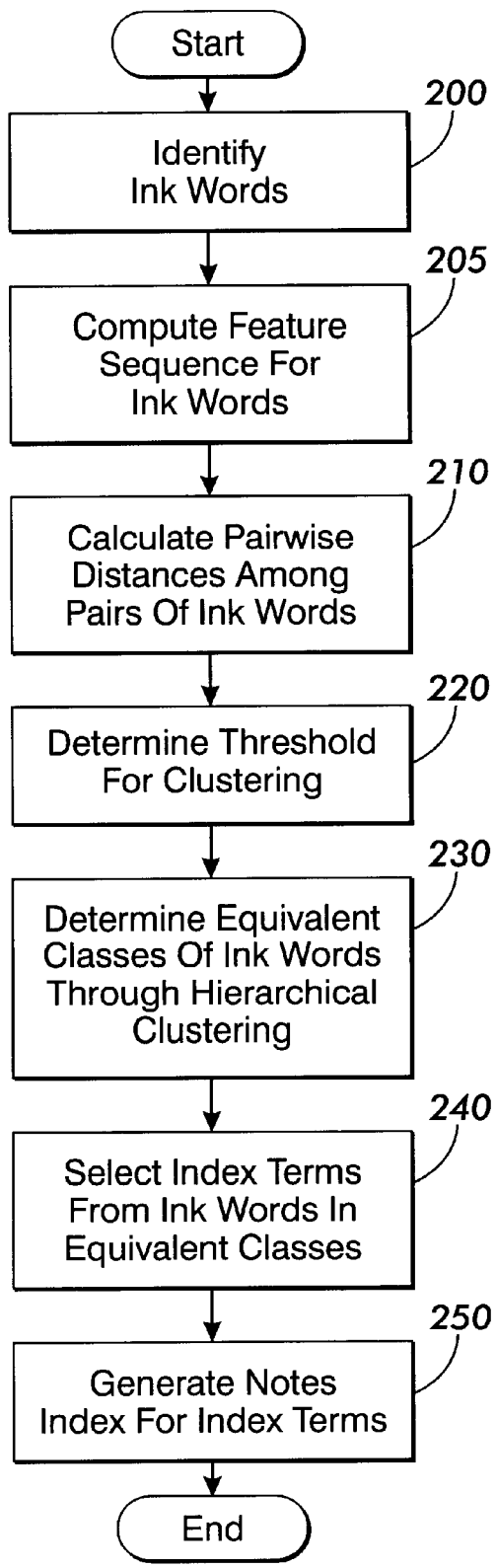
FIG. 2 is a flow diagram illustrating one embodiment for automatically generating an index for handwritten notes.

FIG. 2 is a flow diagram illustrating one embodiment for automatically generating an index for handwritten notes. For this embodiment, the system 100 (FIG. 1) performs pre-processing on the digital ink notes 120 to generate the notes index 130. Specifically, ink words are identified (block 200, FIG. 2 and ink word processing 140, FIG. 1). As described more fully below, the ink words, which roughly correspond to actual words in the digital ink notes 120, are based on time and spacial groupings. Features are computed for the ink words (block 205, FIG. 2 and ink word processing 140, FIG. 1). As described fully below, the features identify characteristics of the ink strokes of the raw data for each ink word. Dynamic programming is used to compute the pairwise distances or match scores for pairs of ink words (block 210, FIG. 2 and distance processing 170, FIG. 1). In general, the pairwise distance measures the distances of the features between two ink words.

Figure 9:
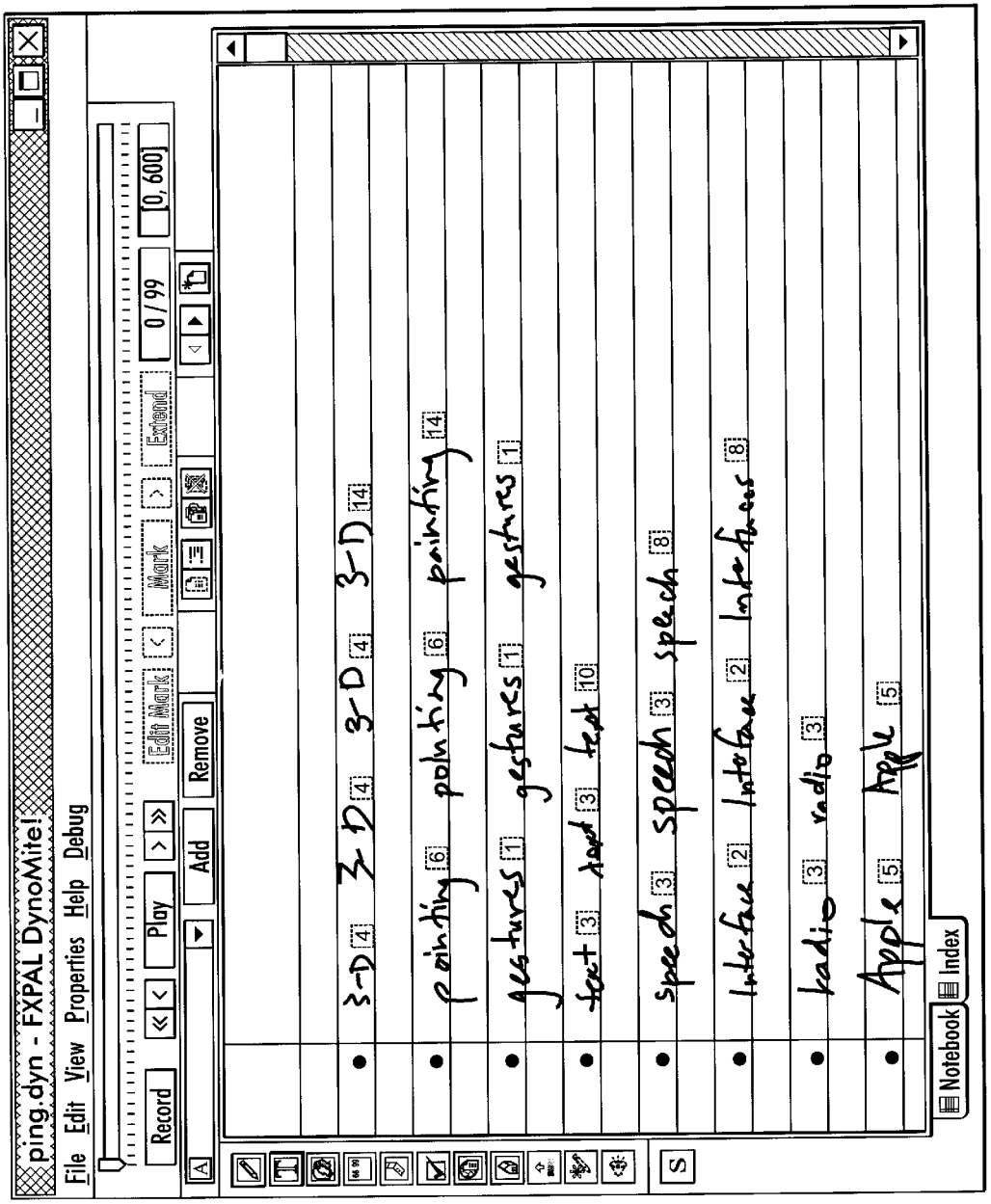
FIG. 9 illustrates an index for handwritten notes configured in accordance with one embodiment of the present invention.

For the embodiment of FIGS. 1 and 2, a hierarchical cluster analysis is performed to identify equivalence classes of ink words (blocks 230, FIG. 2 and hierarchical cluster analysis 180, FIG. 1). In general, the equivalence classes of ink words define those ink words from the digital ink notes 120 with similar features. In most instances, ink words in the same equivalence class may be the same word. However, in other instances, there may be a slight variation in the words (e.g., "pointing" and "painting" may be in the same equivalence class as shown in FIG. 9). To effectively apply the hierarchical cluster analysis to identify the equivalence classes, a threshold is computed (block 220, FIG. 2 and threshold estimation processing 150, FIG. 1). The threshold estimation processing 150 estimates a threshold to define a maximum pairwise distance for use in clustering ink words into the equivalence classes. In general, the novel threshold estimation processing of the present invention generates a distribution curve that depicts the relationship between the number of occurrences for a corresponding pairwise distance (i.e., match score) for the digital ink notes 120 (e.g., see FIG. 7), and estimates the threshold at the knee of the distribution curve. Using this threshold, the hierarchical clustering technique identifies equivalence classes of ink words (block 230, FIG. 2 and hierarchical cluster analysis 180, FIG. 1).

Index terms are selected from the equivalence classes of ink words (block 240, FIG. 2 and index term selection processing 190, FIG. 1). In general, index term processing 190 selects equivalence classes of ink words if the distribution of the ink words in the digital ink notes 120 is non-uniform. Thus, index terms, which appear in multiple places of the document, but do not appear uniformly throughout the document (e.g., the term does not appear on every page), make the best selection for terms to index.

The digital ink notes 120 are indexed using the selected index terms (block 250, FIG. 2 and index generation 160, FIG. 1). To generate the notes index 130, the index terms are referenced to locations in the digital ink notes 120 where the index terms appear. For example, in one embodiment, each index term is labeled to identify the page of the digital ink notes where the term appears. The index term is also hyper linked back to the page of the digital ink notes where the term appears. In another embodiment, the index terms are bolded as they appear in the note pages. Accordingly, the notes index 130 permits a user of the system 100 to easily locate the index terms in the digital ink notes 120.

Ink Word Pre-Processing

In general, ink word pre-processing includes: re-sampling the digital ink notes; parsing the re-sampled digital ink notes into ink words; generating feature sequences for the ink words; and calculating pairwise distances or match scores for pairs of ink words. The ink words are parsed by first grouping the raw data ink strokes into "ink words." The ink words roughly correspond to words in the digital ink notes. These groupings are referred to as "ink words", to distinguish them from the actual words of the notes. As is well known in the art, the raw data for each stroke in an ink word in the digital ink notes 120 is a sequence of sampled points on a trajectory separated equally in time. The ink word processing 140 re-samples the strokes of the digital ink notes 120 so that sample points are based on time and spacial distance. For a further explanation of re-sampling in accordance with one embodiment of the present invention, see T. Tenev, L. Wilcox, T. Cass, U.S. patent application Ser. No. 09/128,255 entitled "A System And Method For Recognizing User Specified Pen-Based Gestures Using Hidden Markov Models", which is expressly incorporated herein by reference. This re-sampling improves robustness for distance processing 170.

Features for the ink words are computed using the re-sampled points. FIG. 3 illustrates an example re-sampled ink word, "word", with coordinates to identify the feature sequences. For this embodiment, the computed features are:

1) The tangent angle $\theta_n$;
2) derivative of the current tangent angle $\delta\theta_n$;
3) the second derivative of the current tangent angle $\delta^2\theta_n$;
4) sin of the tangent angle $\sin \theta_n$; and
5) cosine of the tangent angle $\cos \theta_n$.

A reference angle to measure $\theta_n$ for the re-sampled point $(X_n, Y_n)$ is shown in FIG. 3. Each stroke produces one feature vector sequence. Every feature sequence in the group of strokes, which consist of an ink word, is connected together to create a single feature sequence for each ink word. Although the present invention is described using the feature sequences described above, any feature sequences that sufficiently describe the characteristics of the ink words may be used without deviating from the spirit or scope of the invention.

Match Score for Ink Words

Dynamic programming is used to compute the match score for pairs of ink words. Given two feature sequences of length M and N, the matching score between them is computed as below in the initialization recursion, termination, and matching score steps.

Initialization:

$$\phi(1,1) = |f_1^1 - f_1^2|^2$$

$f_i^1$ indicates the $i^{th}$ element of sequence 1, and $$|f_i^1 - f_j^2|^2$$

is the Euclidean distance between the feature vectors in $i^{th}$ position of word 1 and the $j^{th}$ position of word 2.

Recursion:

$$\phi(i, j) = \min_k \left[ \phi(i - \alpha_k, j - \beta_k) + \omega_k |f_i^1 - f_j^2|^2 + o_k \right]$$

$$i = 1, 2, \ldots M; \quad j = 1, 2, \ldots N$$

where k indicates allowable paths as shown in FIG. 4.

($\alpha_k, \beta_k$) corresponds to a pair of coordinate increments for path k.

$o_k$ is an off-set cost value of path k, and $\omega_k$ is a weight for path k.

$\{\alpha_1, \alpha_2, \alpha_3, \alpha_4, \alpha_5\} = \{1,2,1,1,0\}$ $\{\beta_1, \beta_2, \beta_3, \beta_4, \beta_5\} = \{0,1,1,2,1\}$ $\{o_1, o_2, o_3, o_4, o_5\} = \{1,0,0,0,1\}$ $\{\omega_1, \omega_2, \omega_3, \omega_4, \omega_5\} = \{1,2,1,2,1\}$ k=1 is adopted only when j=1 or j=N. k=5 is adopted only when i=1 or i=M. Inappropriate paths are eliminated, ex. k=2 when i=2.

Termination:

$$\phi(M, N) = \min_k \left[ \phi(M - \alpha_k, N - \beta_k) + \omega_k |f_M^1 - f_N^2|^2 + o_k \right]$$

Matching Score

The match score is computed from the final match of the DP, normalized by length.

$$\frac{\phi(M, N)}{\sqrt{M^2 + N^2}}$$

Hierarchical Clustering

Figure 5:
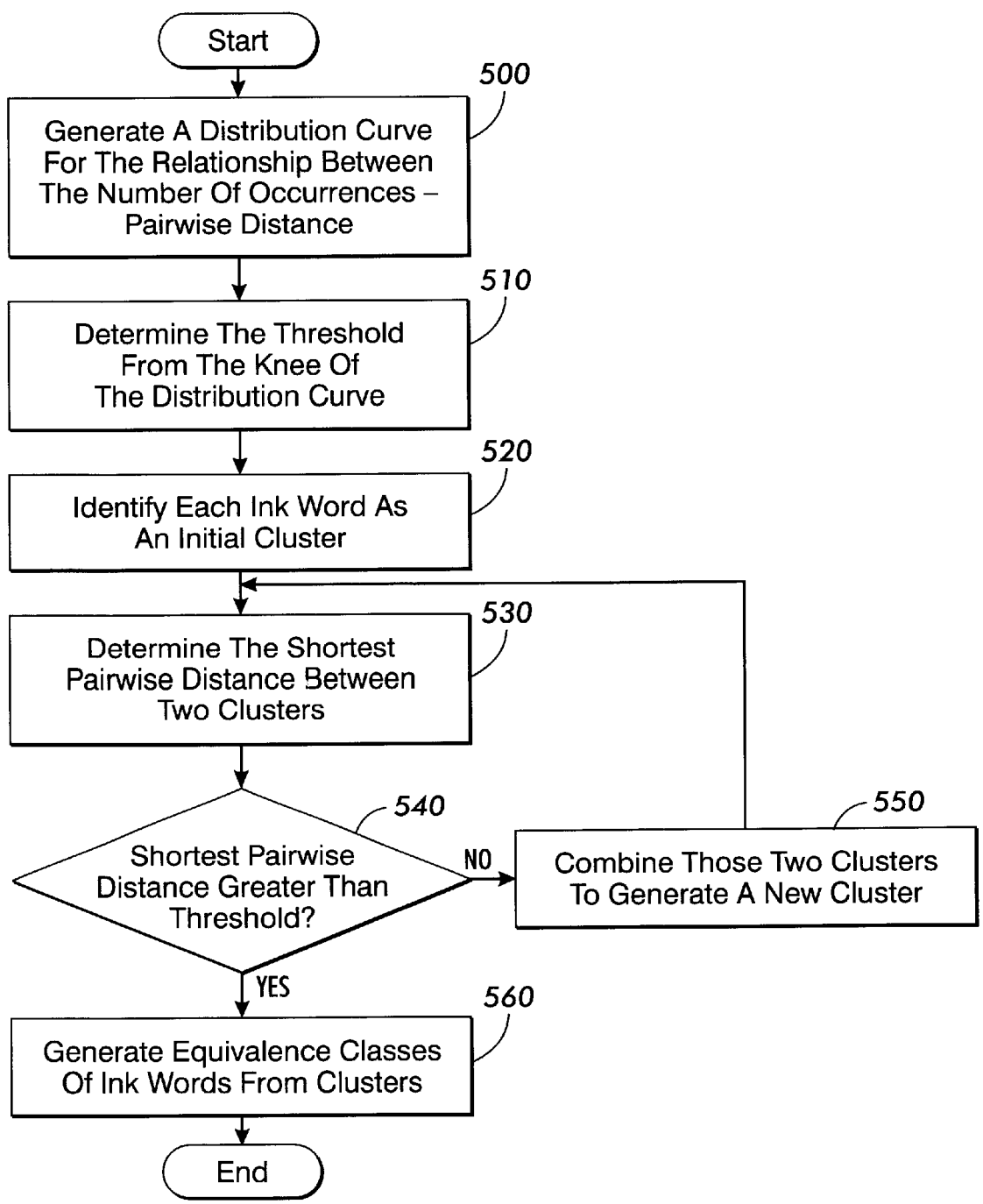
FIG. 5 is a flow diagram illustrating one embodiment for hierarchical clustering for the automatic generation of the notes index.

After estimation of the threshold, hierarchical clustering is performed on the ink words (blocks 220 and 230, FIG. 2). FIG. 5 is a flow diagram illustrating one embodiment for hierarchical clustering for the automatic generation of the notes index. Generally, the threshold is estimated from the knee of the distribution curve for the relationship between the number of occurrences and the pairwise distance, as discussed more fully below (blocks 500 and 510, FIG. 5). Initially, for hierarchical clustering, each ink word is identified as a cluster (block 520, FIG. 5). The shortest pairwise distance (i.e., matching score) between two clusters is calculated. For example, initially, a cluster is identified to include the two ink words that have the shortest pairwise distance. Thus, for this iteration, those two ink words form a single cluster. When computing a distance between two clusters that contain more than two ink words, an average distance of all combinations of the two ink words, each from different clusters, is used to calculate the pairwise distance.

The shortest pairwise distance identified is compared with the threshold (block 540, FIG. 5). If the shortest pairwise distance is less than the threshold, then the two clusters with the shortest pairwise distance identified are combined to generate a new cluster (block 550, FIG. 5). This process of combining clusters with the shortest pairwise distance is continued until the shortest pairwise distance that can be identified is greater than the threshold (blocks 530, 540, and 550, FIG. 5). When the shortest pairwise distance identified is greater than the threshold, the process of combining clusters ceases, and equivalence classes of ink words are identified from the clusters (block 560, FIG. 5).

Figure 6:
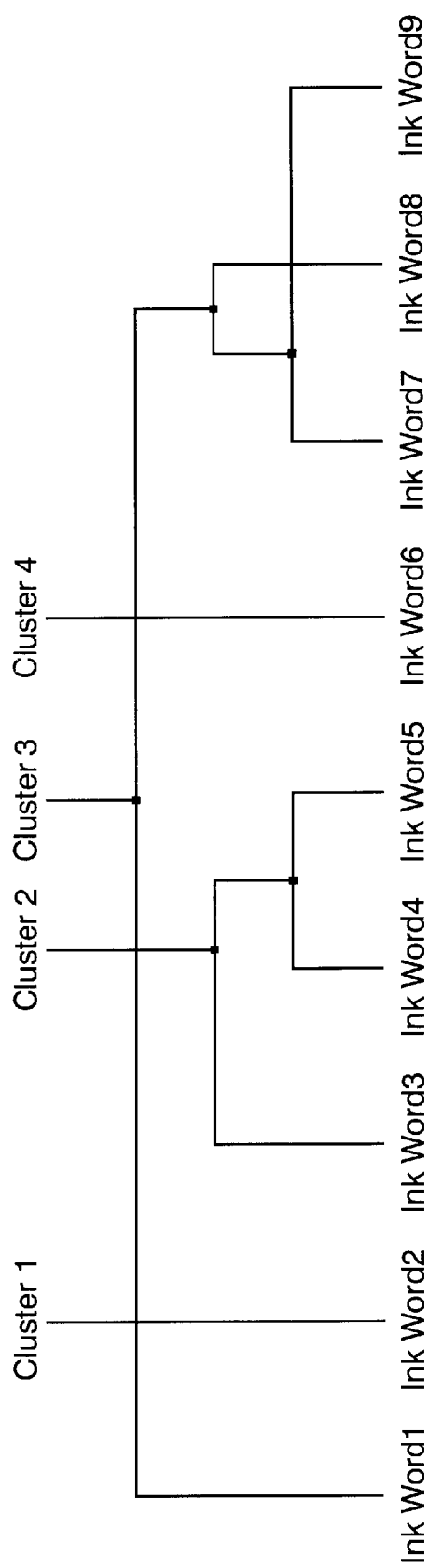
FIG. 6 is a diagram illustrating a simplified example of hierarchical clustering.

FIG. 6 is a diagram illustrating a simplified example of hierarchical clustering. For this example, a cluster, labeled "cluster 2" on FIG. 6, initially includes ink words 4 and 5. Ink word 3 is then combined with the cluster of ink words 4 and 5 to generate "cluster 2." Cluster 3, which consists of ink words 1, 7, 8, and 9 was generated in three iterations of the cluster algorithm. Initially, ink words 7 and 9 were combined to form a cluster, and then ink word 8 was combined with the cluster of ink words 7 and 9 to form a new cluster. Finally, ink word 1 was combined with the cluster of ink words 7, 8, and 9 to form "cluster 3." Note in the example of FIG. 6 that cluster 1 and cluster 4, corresponding to ink word 2 and ink word 6, respectively, were not combined with another ink word. Clusters, which contain only a single ink word, are not used to select index terms from equivalence classes of ink words.

Threshold Estimation

In one embodiment, the threshold for stopping hierarchical clustering is estimated as follows. The pairwise distance between all ink words is computed, the distances are quantitized by y, and a distribution curve is generated. Then, a knee of the curve, $\tau$, is located by approximating the curve with a first line of gradient 0 to $\tau$ and a second line of a constant gradient from $\tau$ on. The approximation is done by minimizing the sum of squared errors to each of the line segments. The procedure described above has two steps. First, make sequence D using first $S_1$ values of the distribution sequence D' with consecutive $S_2$ values under a constraint $S=S_1+S_2(0<S_1, 0<S_2)$.

$$D=\{d^1, d^2, \ldots, d_{S_1}\}$$

$$D'=\{d'_1, d'_2, \ldots, d'_{S_2}\}$$

Second, $\tau$, the knee of the curve, is found by minimizing the following expression.

$$\tau = \gamma \cdot \min_{S_1} \left\{ \frac{1}{S_1} \sum_{i=1}^{S_1} (d_i - \bar{d})^2 + \frac{1}{S_2} \sum_{j=1}^{S_2} (d'_j - \hat{a}j - \hat{b})^2 \right\}$$

$$\bar{d} = \frac{1}{S_1} \sum_{i=1}^{S_1} d_i$$

$$\hat{a} = \frac{\sum_{i=1}^{S_2} i(d'_i - \bar{d})}{\sum_{i=1}^{S_2} i^2}$$

$$\hat{b} = \bar{d}$$

Figure 7:
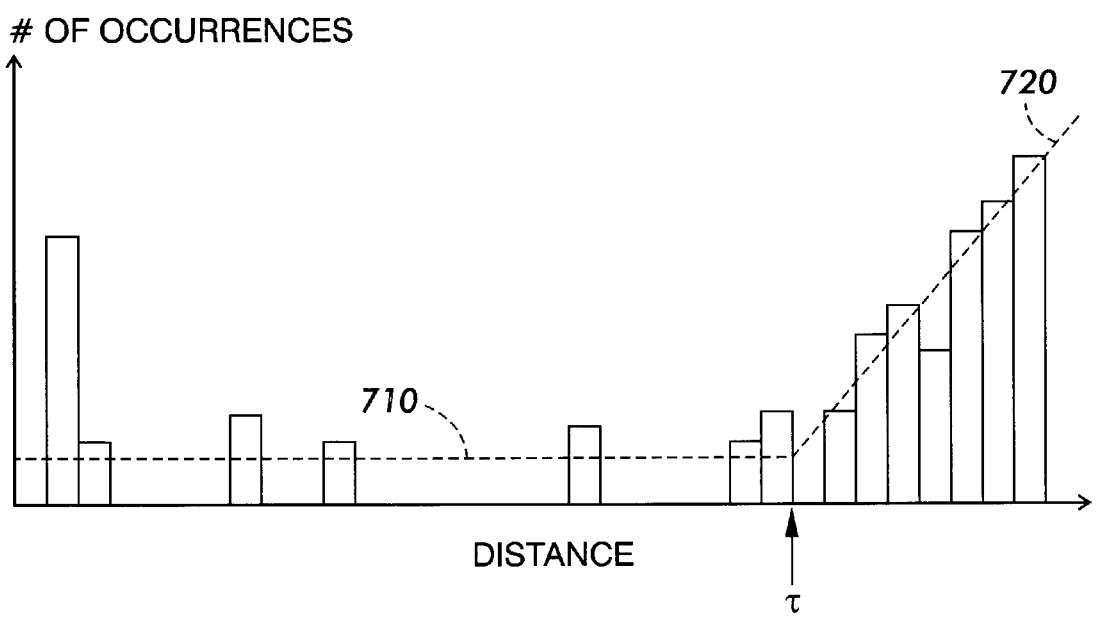
FIG. 7 is an example distribution curve to estimate the threshold for hierarchical clustering.

FIG. 7 is an example distribution curve to estimate the threshold for hierarchical clustering. As shown in FIG. 7, the vertical axis depicts the # of occurrences in the digital ink notes, and the horizontal axis depicts the pairwise distances among pairs of ink words. As shown in FIG. 7, as the distance increases (i.e., moving left to right on the horizontal axis) there is a distance at which the number of occurrences begins to substantially increase. This point, estimated by two line segments, provides an estimation for the threshold. For the example of FIG. 7, the threshold estimation consists of two lines, labeled 710 and 720 on FIG. 7. Line 710 represents the first line of gradient 0 to $\tau$, and line 720 represents the second line of a constant gradient from $\tau$ to distances greater than $\tau$. The knee of the curve, labeled $\tau$ on FIG. 7, is the estimation of the threshold. Accordingly, the threshold represents the maximum difference or distance in a feature sequence for which ink words are assigned to the same equivalence class.

Index Term Selection

Once clusters of ink words have been identified, index terms are selected. Only clusters that contain more than a single ink word are considered as potential index terms. In general, index terms are those terms with a non-uniform distribution throughout the index notes. One measure of the non-uniformity of a distribution is the CHI-square statistic. In one embodiment, the CHI-square statistic is used to select the index terms that are useful for indexing. Also, clusters containing short ink words are eliminated as these terms tend to be "stop words."

Let L be the total number of note pages and let $f_i$ be the number of times a term occurs in the $i^{th}$ note page. Then the total number of occurrences of the term is f, where $$f = \sum_{i=1}^{L} f_i$$

If the term was distributed uniformly through the note pages, the expected number of times it would occur in each note page would be f/L. The CHI-square statistic measures the deviation from the average as follows.

$$CHI\text{-}square = \sum_{i=1}^{L} \left( \frac{f_i - f/L}{f/L} \right)^2$$

To select index terms, the number of terms per page is specified. In one implementation, approximately 3 terms per page is appropriate. Index terms are then selected as the 3L terms with the largest CHI-square values. Alternately, index terms can be picked for each page. In this case, the number of terms per page is specified, and the CHI-square is the. same as above (i.e., assuming there are two note pages, the page in question and all other pages). This method has the advantage that it produces a constant number of terms per page.

Notes Index

Figure 8A:
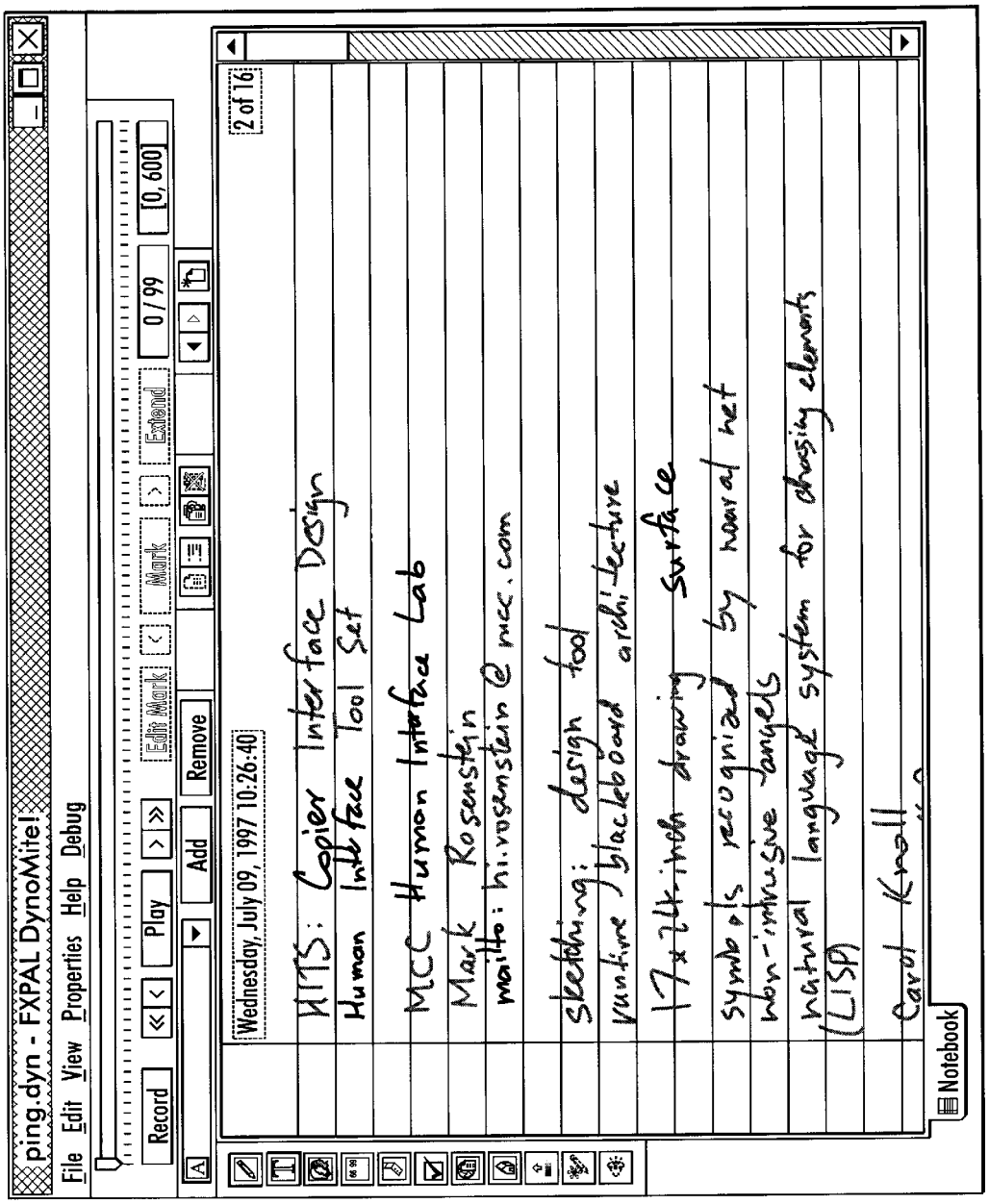
FIG. 8a illustrates a note page with index terms highlighted in bold.
Figure 8B:
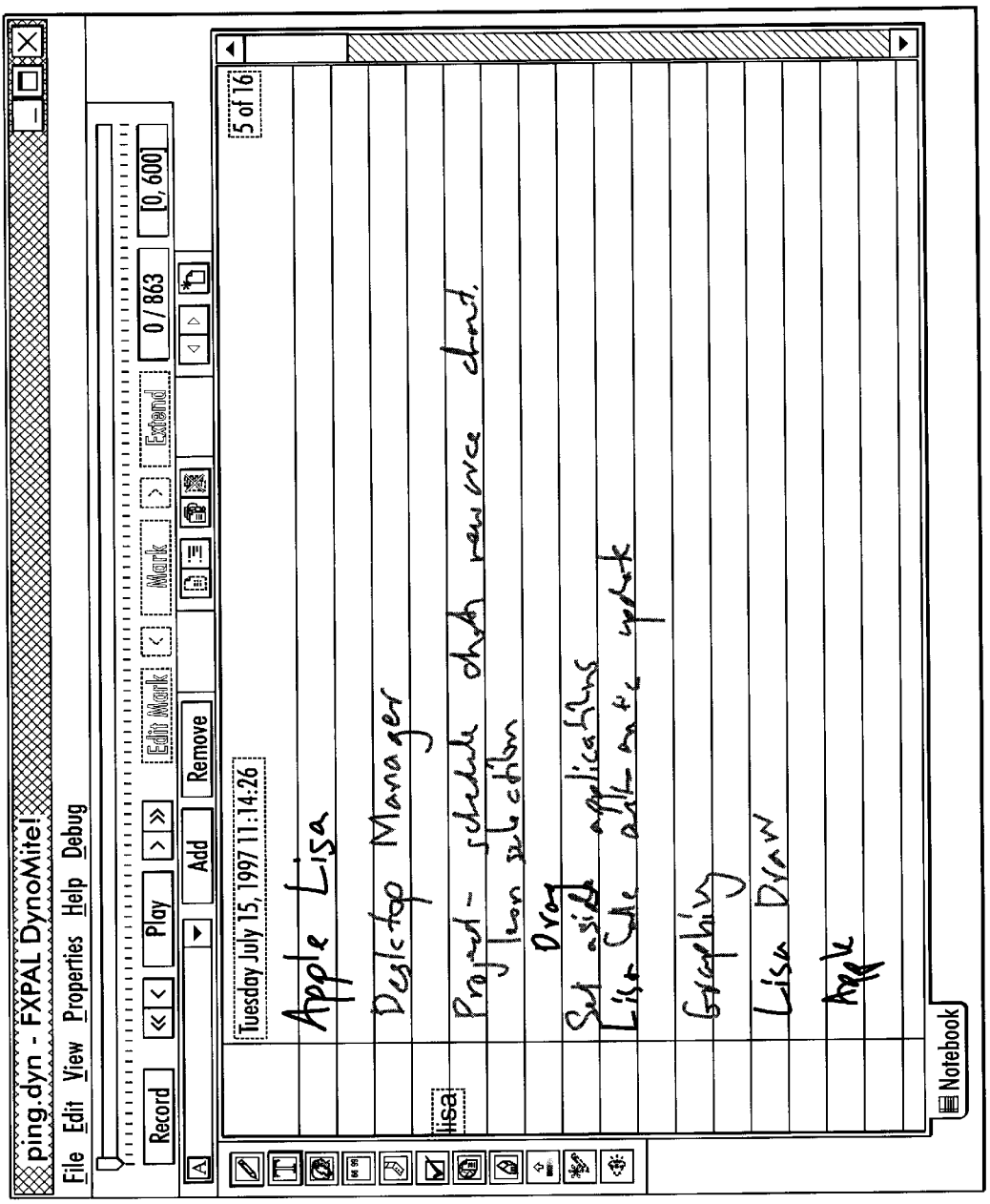
FIG. 8b shows a second note page with index terms highlighted in bold.

FIG. 8a illustrates a note page with index terms highlighted in bold. The highlighting or bolding of index terms in the notes pages facilitates the user in browsing the notes. The index terms for the example note page of FIG. 8a are "Copier", "Human", "Interface", "Lab", "Surface", and "Mailto." FIG. 8b shows a second note page with index terms highlighted in bold. For this example, the index terms are "Apple", "Lisa", and "Drag."

FIG. 9 illustrates an index for handwritten notes configured in accordance with one embodiment of the present invention. For this embodiment, each index term is labeled with an identification of the page for which the corresponding index term appears. For example, the page number 4 is associated with the first three instances of the first equivalence class, "3-D." In addition, the index terms are hyper linked back to the original note page. In order to accomplish this, a reference is made for each ink word to identify that ink word on the page of the handwritten notes that the ink word appeared. These references are also used to generate the hyperlink from the index terms to the corresponding locations in the note pages.

For this embodiment, each line of the index corresponds to an equivalence class. For example, the abbreviation "3-D", was identified in four locations of the notes. The four instances of "3-D" constitute a single equivalence class. Although FIG. 9 illustrates one example for displaying the index of the present invention, any format may be used without deviating from the spirit or scope of the invention.

Applications for Assigning Ink Words into Equivalence Classes

The assigning of ink words into equivalence classes has applications in a variety of digital ink based systems. For example, identification of ink words into equivalence classes has application for summarizing, excerpting, and gisting. The automatic index generation for handwritten notes also has application in annotation systems, where both symbols and words used for annotation are analyzed and presented in index form. The technique of assigning ink words into equivalence classes also has application for finding significant aspects of a document without character recognition or decoding image content. For example, this technique may be used to determine the frequency of words and phrases, for selecting semantically significant images, and to generate a summary about a document.

Computer—Personal Digital Assistant

Figure 10:
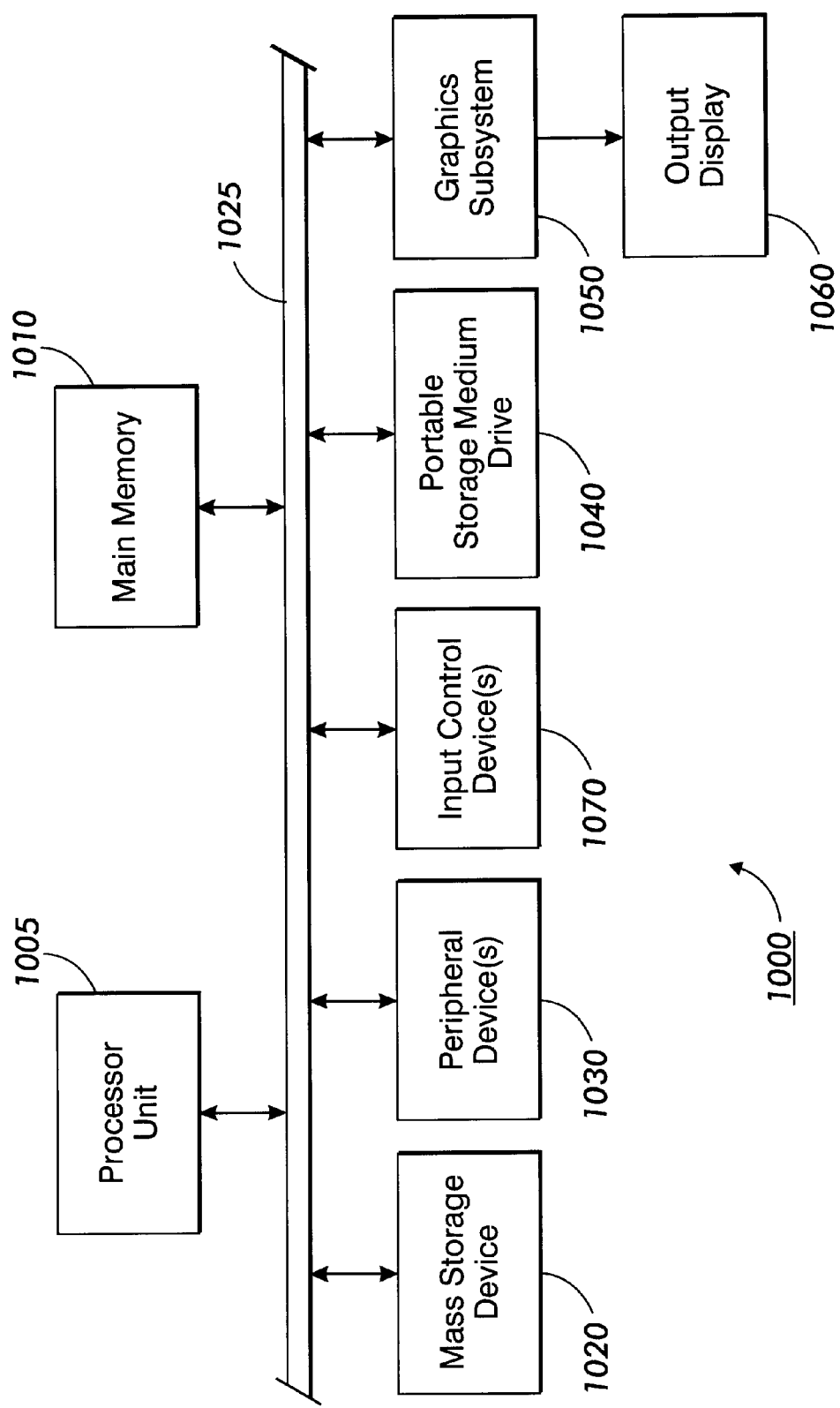
FIG. 10 illustrates a high level block diagram of a general purpose computer or personal digital assistant.

FIG. 10 illustrates a high level block diagram of a general purpose computer or personal digital assistant in which the automatic creation of handwritten notes system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. The main memory 1010 stores the executable code for the automatic creation of handwritten notes system when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 10 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the automatic creation of handwritten notes system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the automatic creation of handwritten notes system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. The handwritten notes (i.e., digital ink) may be input to the computer system 1000 via a portable storage medium or a network for processing by the computer system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. As described above, the computer or PDA includes a pen based input device to receive handwritten notes from a user. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The automatic creation of handwritten notes system may be implemented in either hardware or software. For the software implementation, the automatic creation of handwritten notes system is software that includes a plurality of computer executable instructions for implementation on a general purpose computer system. Prior to loading into a general purpose computer system, the automatic creation of handwritten notes system software may reside as encoded information on a computer readable medium, such as a magnetic floppy disk, magnetic tape, and compact disc read only memory (CD-ROM). In one hardware implementation, the automatic creation of handwritten notes system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for generating an index for handwritten notes captured as digital ink in a computer, said method comprising the steps of:

processing strokes of raw data for handwritten notes captured as digital ink in a computer to identify index terms, wherein an index term comprises at least one ink word, the index terms identified as one of at least two ink words with a pairwise distance within a predetermined threshold;

automatically generating an index for said index terms by linking said index terms to a location in said handwritten notes where said index terms are located; and displaying, on an output display, said index for said handwritten notes.

2. The method as set forth in claim 1, wherein:

the step of generating an index comprises the step of generating page numbers in said handwritten notes for said index terms; and the step of displaying an index comprises the step of displaying said page numbers along with index terms.

3. The method as set forth in claim 1, wherein:

the step of generating an index comprises the step of generating hyper linked index terms to link said index terms to a location in said handwritten notes; and the step of displaying an index comprises the step of displaying index terms as hyper linked text.

4. A method for generating an index for handwritten notes captured as digital ink in a computer, said method comprising the step of:

identifying a plurality of ink words from said handwritten notes;

generating at least one equivalence class of said ink words, wherein an equivalence class comprises at least two ink words with a pairwise distance within a predetermined threshold;

selecting at least one of said equivalence classes of ink words as index terms for said computer handwritten notes; and automatically generating an index for said index terms selected to generate a link from said index terms of an equivalence class to a location in said handwritten notes where said index terms are located.

5. The method as set forth in claim 4, wherein the step of generating at least one equivalence class of said ink words comprises the steps of:

generating a plurality of feature sequences based on time and spatial distances of strokes of raw data in said handwritten notes;

generating said pairwise distance for said pairs of ink words based on said feature sequences; and clustering said ink words into said equivalence classes based on said pairwise distances.

6. The method as set forth in claim 5, wherein the step of clustering said ink words into said equivalence classes comprises the steps of:

identifying each of said ink words as an initial cluster;

selecting, to generate a single cluster, two clusters that comprise the closest pairwise distance;

selecting a threshold to define a maximum pairwise distance; and repeating the step of selecting two clusters that comprise the closest pairwise distance, to generate a single cluster, until said closest pairwise distance exceeds said threshold.

7. The method as set forth in claim 6, wherein the step of selecting a threshold comprises the steps of:

generating a distribution curve that represents a relationship between a number of occurrences among pairs of said ink words at a particular pairwise distance;

identifying a knee of said distribution curve, $\tau$, by approximating said distribution curve with a first line of gradient 0 to $\tau$, and a second line comprising a constant gradient from said knee, $\tau$, throughout said distribution curve; and selecting, as said threshold, said pairwise distance approximated by said knee of said distribution curve, $\tau$.

8. The method as set forth in claim 4, wherein the step of selecting at least one of said equivalence classes of ink words as index terms comprises the step of selecting index terms that occur non-uniform throughout-out said handwritten notes.

9. A method for identifying equivalence classes of ink words in handwritten notes entered into a computer, said method comprising the steps of:

identifying a plurality of ink words from handwritten notes;

identifying a plurality of features of said ink words;

generating a pairwise distance among said ink words based on said features;

generating a distribution curve that represents a relationship between a number of occurrences among pairs of said ink words in said handwritten notes at a particular pairwise distance;

identifying a knee of said distribution curve, $\tau$, by approximating said distribution curve with a first line of gradient 0 to $\tau$, and a second line comprising a constant gradient from said knee, $\tau$, throughout a greater pairwise distance on said distribution curve;

selecting, as a threshold for clustering, said pairwise distance approximated by said knee of said distribution curve, $\tau$; and identifying at least one equivalence class of said ink words by generating clusters of said ink words within a pairwise distance of said threshold.

10. A computer readable medium comprising a plurality of instructions, which when executed by a computer, causing the computer to perform steps of:

processing stokes of raw data for handwritten notes captured as digital ink in a computer to identify index terms, wherein an index term comprises at least one ink word, the index terms identified as one of at least two ink words with a pairwise distance within a predetermined threshold;

automatically generating an index for said index terms by linking said index terms to a location in said handwritten notes where said index terms are located; and displaying, on an output display, said index for said handwritten notes.

11. The computer readable medium as set forth in claim 10, wherein:

the step of generating an index comprises the step of generating page numbers in said handwritten notes for said index terms; and the step of displaying an index comprises the step of displaying said page numbers along with index terms.

12. The computer readable medium as set forth in claim 10, wherein:

the step of generating an index comprises the step of generating hyper linked index terms to link said index terms to a location in said handwritten notes; and the step of displaying an index comprises the step of displaying index terms as hyper linked text.

13. A computer readable medium comprising a plurality of instructions, which when executed by a computer, causing the computer to perform steps of:

identifying a plurality of ink words from said handwritten notes;

automatically generating at least one equivalence class of said ink words, wherein an equivalence class comprises at least two ink words with a pairwise distance within a predetermined threshold;

selecting at least one of said equivalence classes of ink words as index terms for said computer handwritten notes; and generating an index for said index terms selected to generate a link from said index terms of an equivalence class to a location in said handwritten notes where said index terms are located.

14. The computer readable medium as set forth in claim 13, wherein the step of generating at least one equivalence class of said ink words comprises the steps of:

generating a plurality of feature sequences based on time and spatial distances of strokes of raw data in said handwritten notes;

generating said pairwise distance for said pairs of ink words based on said feature sequences; and clustering said ink words into said equivalence classes based on said pairwise distances.

15. The computer readable medium as set forth in claim 14, wherein the step of clustering said ink words into said equivalence classes comprises the steps of:

identifying each of said ink words as an initial cluster;

selecting, to generate a single cluster, two clusters that comprise the closest pairwise distance;

selecting a threshold to define a maximum pairwise distance; and repeating the step of selecting two clusters that comprise the closest pairwise distance, to generate a single cluster, until said closest pairwise distance exceeds said threshold.

16. The computer readable medium as set forth in claim 15, wherein the step of selecting a threshold comprises the steps of:

generating a distribution curve that represents a relationship between a number of occurrences among pairs of said ink words at a particular pairwise distance;

identifying a knee of said distribution curve, $\tau$, by approximating said distribution curve with a first line of gradient 0 to $\tau$, and a second line comprising a constant gradient from said knee, $\tau$, throughout said distribution curve; and selecting, as said threshold, said pairwise distance approximated by said knee of said distribution curve, $\tau$.

17. The computer readable medium as set forth in claim 13, wherein the step of selecting at least one of said equivalence classes of ink words as index terms comprises the step of selecting index terms that occur non-uniform throughout-out said handwritten notes.

18. A computer readable medium comprising a plurality of instructions, which when executed by a computer, causing the computer to perform steps of:

identifying a plurality of ink words from handwritten notes;

identifying a plurality of features of said ink words;

generating a pairwise distance among said ink words based on said features;

generating a distribution curve that represents a relationship between a number of occurrences among pairs of said ink words in said handwritten notes at a particular pairwise distance;

identifying a knee of said distribution curve, $\tau$, by approximating said distribution curve with a first line of gradient 0 to $\tau$, and a second line comprising a constant gradient from said knee, $\tau$, throughout a greater pairwise distance on said distribution curve;

selecting, as a threshold for clustering, said pairwise distance approximated by said knee of said distribution curve, $\tau$; and identifying at least one equivalence class of said ink words by generating clusters of said ink words within a pairwise distance of said threshold.

19. A computer comprising:

a user input pen-based device for receiving stokes of raw data for handwritten notes;

processor unit, coupled to said user input pen-based device, for processing said stokes of raw data for handwritten notes to identify a plurality of index terms, wherein an index term comprises at least one ink word, the index terms identified as one of at least two ink words with a pairwise distance within a predetermined threshold, and for automatically generating an index for said index terms by linking said index terms to a location in said handwritten notes where said index terms are located; and an output display, coupled to said processor unit, for displaying said index for said handwritten notes.

* * * * *